United States Patent
Henderson et al.

(10) Patent No.: US 9,302,214 B2
(45) Date of Patent: Apr. 5, 2016

(54) PURIFICATION OF NITROGEN TRIFLUORIDE BY PRESSURE SWING ABSORPTION

(71) Applicant: AIR PRODUCTS AND CHEMICALS, INC., Allentown, PA (US)

(72) Inventors: Philip Bruce Henderson, Allentown, PA (US); Richard Paul Underwood, Allentown, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 7 days.

(21) Appl. No.: 14/466,194

(22) Filed: Aug. 22, 2014

(65) Prior Publication Data

US 2016/0051923 A1    Feb. 25, 2016

(51) Int. Cl.
*B01D 53/04* (2006.01)
*B01D 53/047* (2006.01)

(52) U.S. Cl.
CPC ........ *B01D 53/047* (2013.01); *B01D 2253/108* (2013.01); *B01D 2256/26* (2013.01); *B01D 2257/20* (2013.01); *B01D 2257/40* (2013.01); *B01D 2259/40056* (2013.01)

(58) Field of Classification Search
CPC ........... B01D 53/047; B01D 2253/108; B01D 2256/26; B01D 2257/20; B01D 2257/40; B01D 2259/40056
USPC ...................................... 95/96, 103–105, 131
See application file for complete search history.

(56) References Cited

U.S. PATENT DOCUMENTS

| | | | |
|---|---|---|---|
| 5,069,690 A | 12/1991 | Henderson et al. | |
| 5,069,887 A | 12/1991 | Suenaga et al. | |
| 5,417,742 A * | 5/1995 | Tamhankar | ........ B01D 53/0462 95/462 |
| 7,022,160 B2 | 4/2006 | Igumnov et al. | |
| 7,569,122 B2 | 8/2009 | Lee | |
| 7,637,986 B2 | 12/2009 | Park et al. | |
| 7,842,125 B2 | 11/2010 | Park et al. | |
| 2002/0023540 A1 * | 2/2002 | Abe | ........ B01D 53/02 96/134 |
| 2003/0221556 A1 * | 12/2003 | Igumnov | ................ B01D 53/04 95/131 |
| 2005/0096490 A1 * | 5/2005 | Henderson | ............ C07C 17/389 570/179 |
| 2006/0228285 A1 * | 10/2006 | Singh | .................. C01B 21/0837 423/406 |
| 2007/0084345 A1 * | 4/2007 | Tajima | ................. B01D 53/025 96/101 |

* cited by examiner

*Primary Examiner* — Frank Lawrence
(74) *Attorney, Agent, or Firm* — Anne B. Kiernan; Kevin B. Anderson

(57) ABSTRACT

A pressure-swing adsorption process for producing a purified nitrogen trifluoride ($NF_3$) product gas from a feed gas contaminated with carbon tetrafluoride ($CF_4$) using a column packed with an adsorbent that exhibits selectivity for $NF_3$ over $CF_4$. The process separates the feed gas into a first product gas having a greater concentration of $CF_4$ than the feed gas and a second product gas having a lesser concentration of $CF_4$ without the use of an inert carrier gas while recovering essentially all of the $NF_3$. The process includes filling the column with the feed gas until the column reaches a first pressure, removing the first product gas, and then removing the second product gas, where after the second product gas is removed the column is at a second pressure. A rinse gas of $NF_3$ and $CF_4$ may be used to remove the first product gas or the second product gas.

23 Claims, 2 Drawing Sheets

PURIFICATION OF NITROGEN TRIFLUORIDE BY PRESSURE SWING ABSORPTION

TECHNICAL FIELD

The present invention relates generally to an adsorption-based process for purifying nitrogen trifluoride, and more particularly to removing carbon tetrafluoride from nitrogen trifluoride by pressure swing adsorption.

BACKGROUND OF THE INVENTION

Nitrogen trifluoride ($NF_3$) is a gas with a number of industrial applications, particularly in the manufacture of displays, semiconductors, and photovoltaics. For example, $NF_3$ is commonly used as an etchant in a plasma etching process for silicon wafers. A common challenge in the use of $NF_3$ in industrial processes is the presence of carbon tetrafluoride ($CF_4$), a common byproduct of typical $NF_3$ production processes. For example, $NF_3$ is often produced by a reaction of ammonia with fluorine gas, which typically includes $CF_4$ as a contaminant, or by electrolysis using carbon anodes, which produces $CF_4$ along with the desired $NF_3$. The presence of $CF_4$ may adversely impact processes using $NF_3$. For example carbon may be deposited during plasma etching with $NF_3$ due to the presence of the $CF_4$. Accordingly, it is desirable to purify a $NF_3$ gas of $CF_4$ prior to use.

SUMMARY OF THE INVENTION

Embodiments of the present invention include methods for purifying nitrogen trifluoride ($NF_3$) contaminated with carbon tetrafluoride ($CF_4$) by first filling an adsorption column with a first volume of a feed gas consisting essentially of $NF_3$ and $CF_4$ until the adsorption column reaches a first pressure greater than an initial pressure of the adsorption column, wherein the adsorption column includes an adsorbent material that selectively adsorbs $NF_3$ over $CF_4$. The adsorbent material will adsorb a portion of the feed gas having a greater concentration of $NF_3$ than the feed gas, wherein an unadsorbed portion of the feed gas in the adsorption column has a greater concentration of $CF_4$ than the feed gas. A first product gas is then removed from the column having a greater concentration of $CF_4$ than the feed gas. A second product gas is then removed from the column having a lesser concentration of $CF_4$ than the feed gas. After removing the second product gas, the column is at second pressure less than the first pressure. A rinse gas containing $NF_3$ and $CF_4$ may be used to aid in removing the first product gas, but the method does not include using any substantial volume of an inert carrier gas at any step. The adsorbent material may be a zeolite.

Embodiments of the present invention further include methods for separating a mixture of $NF_3$ and $CF_4$ including providing an adsorption column packed with an adsorbent material that preferentially adsorbs $NF_3$ over $CF_4$, the column including a feed end and, a product end opposite the feed end, both of which are initially closed; opening the feed end of the adsorption column; and flowing a first volume of a feed gas of $NF_3$ and $CF_4$ into the feed end of the adsorption column until the adsorption column reaches a first pressure, so that a fraction of the $NF_3$ of the first volume of the feed gas is adsorbed by the adsorption material. The product end of the adsorption column is then opened, and a second volume of the feed gas is flowed into the feed end of the adsorption column to maintain the first pressure within the adsorption column while a first product having a $CF_4$ concentration greater than the $CF_4$ concentration of the feed gas exits the product end of the adsorption column. The feed end of the column is then closed, so that a second product having a $CF_4$ concentration less than the $CF_4$ concentration of the feed gas exits the product end of the adsorption column until the adsorption column reaches a second pressure less than the first pressure.

Embodiments of the present invention further include methods for separating a mixture of $NF_3$ and $CF_4$ including providing an adsorption column packed with an adsorbent material that preferentially adsorbs $NF_3$ over $CF_4$ including a feed end and, a product end opposite the feed end, both of which are initially closed; opening the feed end of the adsorption column; and flowing a first volume of a feed gas comprising $NF_3$ and $CF_4$ into the feed end of the adsorption column until the adsorption column reaches a first pressure, so that a fraction of the $NF_3$ of the first volume of the feed gas is adsorbed by the adsorption material. The product end of the adsorption column is then opened, so that a first product having a $CF_4$ concentration greater than the $CF_4$ concentration of the feed gas exits the product end of the adsorption column until the adsorption column reaches a second pressure less than the first pressure, and, after the adsorption column reaches the second pressure, a second product having a $CF_4$ concentration less than the $CF_4$ concentration of the feed gas exits the product end of the adsorption column until the adsorption column reaches a third pressure less than the second pressure.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
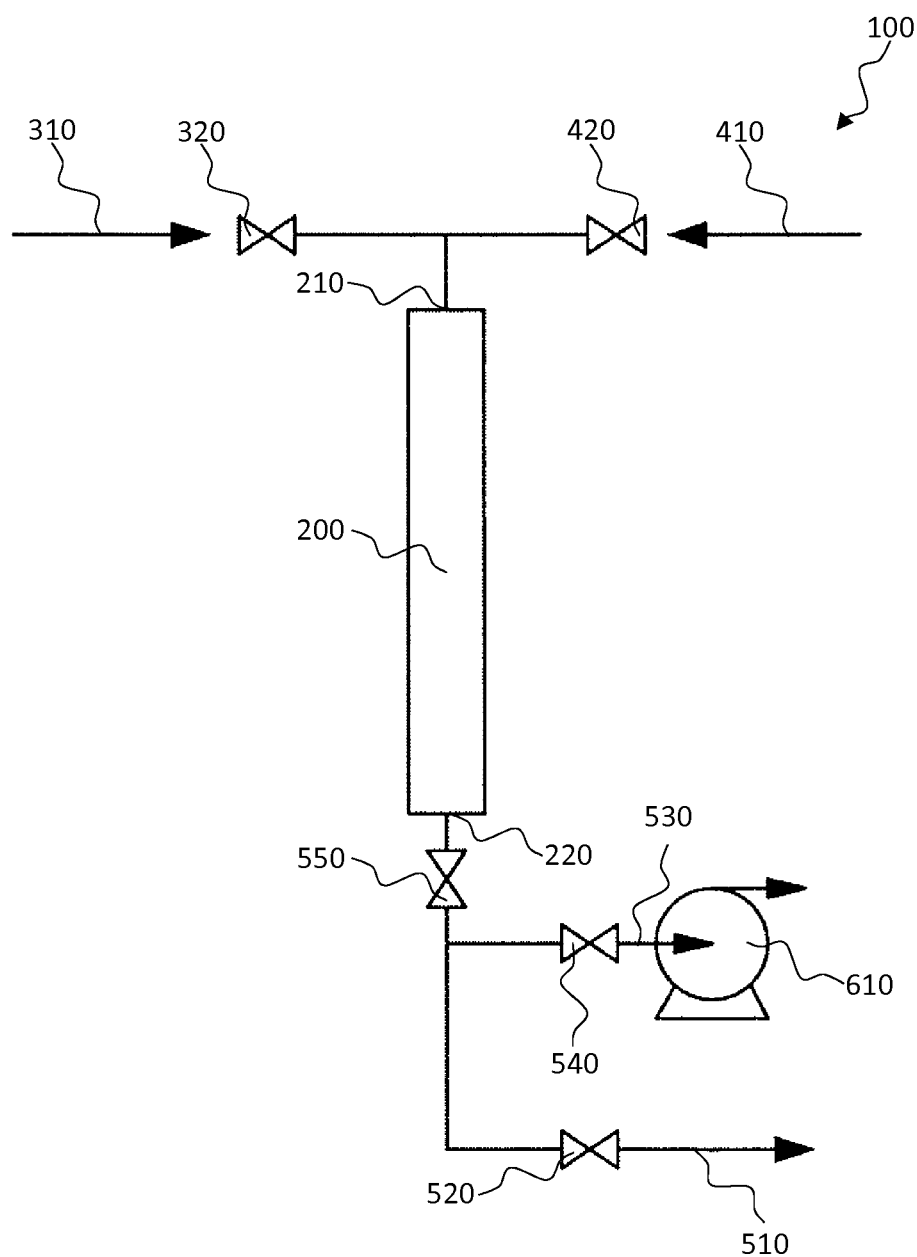
FIG. 1 depicts a process flow diagram of an apparatus used to fractionate feed $NF_3$ gas contaminated with $CF_4$ into a first $NF_3$ product gas having a higher concentration of $CF_4$ than the feed gas and a second $NF_3$ product gas having a lower concentration of $CF_4$ than the feed gas, according to an exemplary embodiment of the present invention.

Embodiments of the present invention includes methods of using pressure swing adsorption to separate a feed gas including nitrogen trifluoride ($NF_3$) and carbon tetrafluoride ($CF_4$)

into two product gases: a first product gas including $NF_3$ and $CF_4$ having a higher concentration of $CF_4$ than the feed gas, and a second product gas including $NF_3$ and $CF_4$ having a lower concentration of $CF_4$ than the feed gas. As used in this description, "pressure swing adsorption" refers to any process used to fractionate a mixture of gases based on the relative affinity of the component gases for an adsorbent at different pressures, including pressures below ambient pressure, typically referred to as vacuum swing adsorption.

While methods of separating $NF_3$ and $CF_4$ are known, the known methods suffer from a number of drawbacks avoided by the present invention, including, but not limited to the following: First, an inert carrier gas is typically used to carry the $NF_3$ and $CF_4$ feed gas through the purification process, necessitating an additional process to remove the inert carrier gas from the purified $NF_3$ product gas. Second, they typically require long purification times that limit the commercial viability of the process. Third, they typically produce a waste stream containing a high volume of $CF_4$, but also containing a volume of $NF_3$. Because $NF_3$ is expensive to produce, it is desirable to recover as much of the $NF_3$ as a commercially viable product as possible and accordingly undesirable for any $NF_3$ to be lost in a waste stream.

Embodiments of the present invention address these drawbacks by, rather than removing a waste stream from a contaminated $NF_3$ gas, using a pressure swing adsorption process to fractionate a $NF_3$ gas contaminated with $CF_4$ into a first gas of a higher concentration of $CF_4$ for a first market that is able to tolerate higher concentrations of $CF_4$ and a second gas of a lower concentration of $CF_4$ for a second market whose applications are highly sensitive to $CF_4$ and therefore require a supply of highly pure $NF_3$. As a result, embodiments of the present invention are able to produce a $NF_3$ gas of the desired purity without wasting essentially any $NF_3$. Embodiments further do not require the use of an inert carrier gas, thereby avoiding the need for an additional process to remove the inert carrier gas from the product gas and reducing costs. In one embodiment, the process includes first filling an adsorption column including an adsorbent material that selectively adsorbs $NF_3$ over $CF_4$ with a first volume of a feed gas consisting essentially of $NF_3$ and carbon tetrafluoride ($CF_4$) until the adsorption column reaches a first pressure greater than an initial pressure of the adsorption column; removing a first product gas having a greater concentration of $CF_4$ than the feed gas from the adsorption column; and, after removing the first product gas, removing a second product gas having a lesser concentration of $CF_4$ than the feed gas from the adsorption column. After removing the second product gas, the column has a second pressure less than the first pressure.

Referring to FIG. 1, embodiments of the present invention purify a feed gas 310 including primarily $NF_3$ and $CF_4$. The $CF_4$ concentration of the feed gas 310 may range, for example, from approximately 20 ppm to approximately 1000 ppm, though the process will also work at $CF_4$ concentrations outside this range. The feed gas 310 may also contain trace amounts of other compounds, but the concentration of these compounds are substantially low enough to not affect the functioning of the separation process. The feed gas 310 is separated by pressure swing adsorption using an apparatus 100 including an adsorption column (hereinafter, "the column") 200 packed with an adsorption material capable of selectively adsorbing $NF_3$ over $CF_4$ at a first pressure, where the $NF_3$ desorbs from the adsorption material at a second pressure less than the first pressure. The selective adsorption of $NF_3$ may be based on equilibrium selectivity, where the $NF_3$ has a greater affinity for the adsorption material than the $CF_4$, kinetic selectivity based on relative rates of adsorption between $NF_3$ and $CF_4$, or both equilibrium and kinetic selectivity. Equilibrium selective adsorption materials preferentially include metal cation-exchanged zeolites to provide high charge density centers for interaction with the molecular dipole of $NF_3$. Non-limiting examples of equilibrium selective adsorption materials include alkali or alkaline earth-exchanged zeolites, such as zeolites of type LTA (Linde type A), FAU (Faujasite), CHA (Chabazite), and ERI (Erionite). Kinetically selective adsorption materials have pore size or pore opening that is close to the molecular sizes of $NF_3$ (kinetic diameter of 3.6 angstroms) and $CF_4$ (kinetic diameter of 4.6 angstroms), i.e., having a pore size ranging from approximately 3.6 angstroms to approximately 4.6 angstroms. Non-limiting examples of kinetically selective adsorption materials include zeolites and carbon molecular sieves engineered to have pore openings of a controlled size in the desired range. Some adsorption materials, particularly some zeolites, may preferably exhibit both equilibrium and kinetic selectivity for $NF_3$ over $CF_4$. Suitable zeolites may be either synthetic or naturally occurring. In a preferred embodiment, the adsorption material includes chabazite, such as the AW-500 MOLSIV™ adsorbent manufactured by Honeywell UOP, which includes primarily chabazite zeolite, with a smaller amount of erionite zeolite. In an exemplary embodiment, the adsorption material is in the form of pellets, extrudates, beads, granules or any other suitable adsorbent form of any suitable diameter for packing into the column 200. The size and shape of the adsorption material are dependent on the scale of the separation, according to well-known adsorption separation engineering principles.

The column 200 may include a feed end 210 through which the feed gas 310 enters the column 200 and a product end 220 through which the product gases 510, 530 are removed. Flow of the feed gas 310 into the column 200 may be controlled by a feed valve 320. Flow of the product gases 510, 530 out of the column 200 may be controlled by a product end valve 550. A rinse gas 410 may also be flowed into the feed end 210 of the column 200 in various embodiments, where flow of the rinse gas 410 may be controlled by a rinse gas valve 420. After passing through the product end valve 550, the product gases 510, 530 may be diverted to separate locations by first product valve 520 and second product valve 540. The dimensions of the column 200 are dependent on the scale of the separation, according to well-known adsorption separation engineering principles. While embodiments will be described in terms of the apparatus 100, it will be understood that the other configurations of transporting the relevant gases to and from the column 200 may be utilized without departing from the scope of the present invention. It will be understood that, while FIG. 1 depicts just a single column, the process may also employ multiple columns in parallel, where the process is staggered between the multiple columns to allow for a more continuous flow of feed and product gases.

Figure 2:
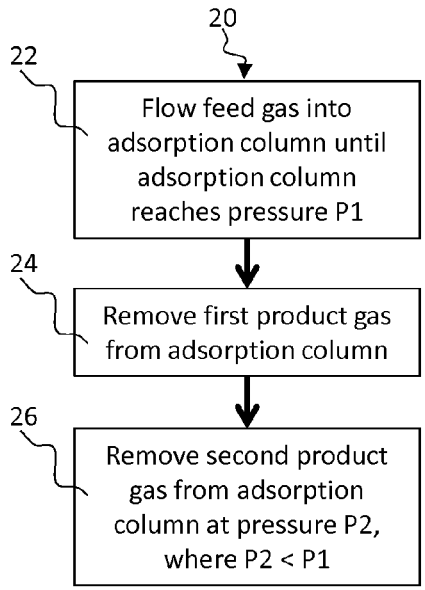
FIG. 2 depicts a flowchart of a method of fractionating a $NF_3$ feed gas contaminated with $CF_4$ into a first $NF_3$ product gas having a higher concentration of $CF_4$ than the feed gas and a second $NF_3$ product gas having a lower concentration of $CF_4$ than the feed gas, according to an exemplary embodiment of the present invention.

Referring to FIG. 2, the feed gas 310 is fractionated into a first product gas 510 having a greater concentration of $CF_4$ than the feed gas 310 and a second product gas 530 having a lesser concentration of $CF_4$ than the feed gas 310 using the apparatus 100, according to a method 20.

First, at step 22 of the method 20, the column 200 is filled with a first volume of the feed gas 310 until the pressure in the adsorption chamber reaches a first pressure P1. While the preferred pressure P1 will depend on the adsorbent properties of the adsorption material, in an exemplary embodiment, the first pressure P1 may range from approximately 1 pounds per square inch absolute (psia) to the pressure of the feed gas 310. For the AW-500 adsorbent, a pressure P1 of approximately 20 psia to approximately 30 psia was found to be preferable, though greater and lesser pressures are explicitly contemplated. At pressure P1, the adsorption material packed into the column 200 will adsorb a quantity of $NF_3$ from the first volume of the feed gas 310, so that the column 200 contains an adsorbed phase relatively rich in $NF_3$ and an unadsorbed phase relatively rich in $CF_4$ relative to the feed gas 310.

At step 24 of the method 20, the first product gas 510 is then removed from the column 200 including at least a portion of the unadsorbed phase, so that the first product gas has a greater concentration of $CF_4$ than the feed gas 310.

At step 26 of the method 20, the second product gas 530 is then removed while the pressure in the column is reduced to a second pressure P2 less than the first pressure P1 causing the adsorbed phase desorb. As a result, the adsorbed phase is removed from the column 200 as part of the second product gas 530, so that the second product gas 530 has a lesser concentration of $CF_4$ than the feed gas 310. While the preferred pressure P2 will depend on the adsorbent properties of the adsorption material, in an exemplary embodiment, the second pressure P2 may be any pressure less than P1 that provides the desired separation profile.

As a result of the desorption, the adsorption material regenerates its ability to selectively adsorb $NF_3$ and the process may then be repeated for another cycle. In some embodiments, as described in greater detail below, a portion of the first product gas 510, the second product gas 530, or both, may be removed at an intermediate pressure between P1 and P2, or at a constantly changing pressure as the column 200 moves from P1 to P2. For the AW-500 adsorbent, a pressure P2 of approximately 0.5 psia to approximately 15 psia was found to be preferable, though greater and lesser pressures are explicitly contemplated.

Figure 3:
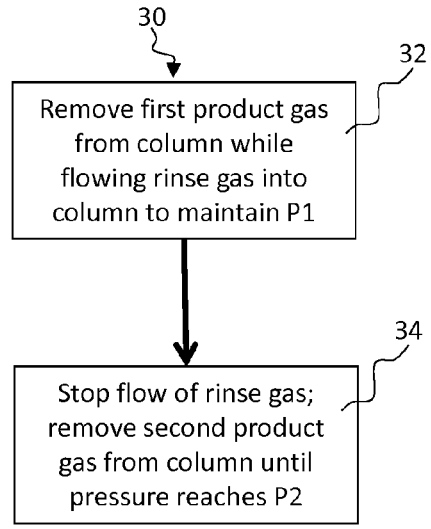
FIG. 3 depicts a flowchart of conditions under which the first product gas and the second product gas are removed from the adsorption column, according to an exemplary embodiment of the present invention.
Figure 4:
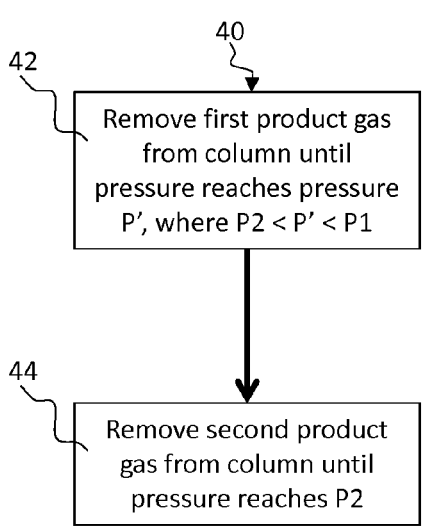
FIG. 4 depicts a flowchart of conditions under which the first product gas and the second product gas are removed from the adsorption column, according to an exemplary embodiment of the present invention.

Various exemplary conditions under which the first product gas 510 and the second product gas 530 may be removed from the column 200 (i.e., perform steps 24 and 26 of the method 20) are described in more detail below in conjunction with FIGS. 3-5. To remove the first product gas 510 from the column 200, a rinse gas must be flowed into the column 200, as depicted in FIG. 3, or the pressure in the column 200 must either be lowered to a pressure less than P1, as depicted in FIG. 4. In some embodiments, both a rinse gas and a reduction in pressure may be used to remove the first product gas 510 from the column 200, as depicted in FIG. 5.

Referring to FIG. 3, the first product gas 510 and the second product gas 530 may be removed from the column 200 (i.e., perform steps 24 and 26 of the method 20) by a method 30 including, after allowing the adsorbed phase and the unadsorbed phase to form in the column 200, first opening the product end 220 and removing the first product gas 510 from the product end 220 of the column 200 while opening the feed end 210 and flowing the rinse gas 410 into the feed end 210 of the column 200 to maintain the pressure P1 in the column 200 (step 32). Flowing the rinse gas 410 into the feed end 210 of the column 200 forces at least a portion of the unadsorbed phase to exit the product end 220 of the column 200. To avoid introducing any substantial quantity of undesired compounds, for example an inert carrier gas, into the column 200, the rinse gas 410 contains substantially only $NF_3$ and $CF_4$. In an exemplary embodiment, the rinse gas 410 is a second volume of the feed gas 310. In another embodiment, wherein the method has already been performed for at least one cycle, the rinse gas 410 may be a volume of the second product gas 530. After collection of the desired volume of the first product gas 510, the feed end 210 may be closed and the flow of the rinse gas 410 may be stopped and the second product gas 530 may be collected from the product end 220 of the column 200 while the pressure in the column 200 drops from P1 to P2 (step 34).

Referring to FIG. 4, the first product gas 510 and the second product gas 530 may be removed from the column 200 (i.e., perform steps 24 and 26 of the method 20) by a method 40 including, after allowing the adsorbed phase and the unadsorbed phase to form in the column 200, first opening the product end 220 and removing the first product gas 510 from the product end 220 of the column 200 without the use of the rinse gas 410 while the pressure in the column 200 drops from P1 to P', where P1>P'>P2 (step 42). As the pressure in the column 200 drops from P1 to P', a portion of the adsorbed phase will desorb and force at least a portion of the unadsorbed phase to exit the product end 220 of the column 200, similar to the function of the rinse gas 410 described above in FIG. 3. After collection of the desired volume of the first product gas 510, the second product gas 530 may be collected from the product end 220 of the column 200 while the pressure in the column 200 drops from P' to P2, causing the remaining portion of the adsorbed phase to desorb (step 44).

Figure 5:
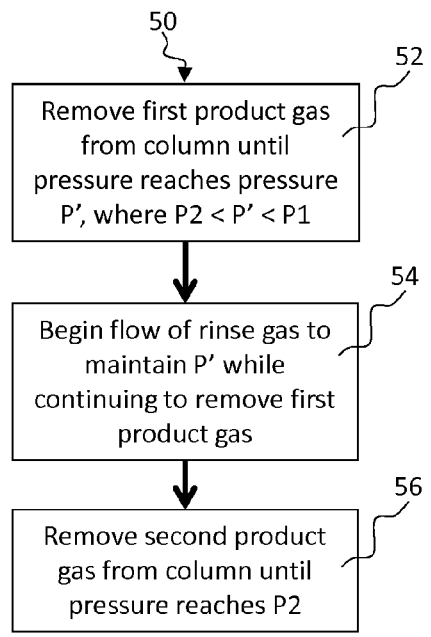
FIG. 5. depicts a flowchart of conditions under which the first product gas and the second product gas are removed from the adsorption column, according to an exemplary embodiment of the present invention.

Referring to FIG. 5, the first product gas 510 and the second product gas 530 may be removed from the column 200 (i.e., perform steps 24 and 26 of the method 20) by a method 50 including, after allowing the adsorbed phase and the unadsorbed phase to form in the column 200, first opening the product end 220 and removing the first product gas 510 from the product end 220 of the column 200 without the use of the rinse gas 410 while the pressure in the column 200 drops from P1 to P' (step 52). Once the column 200 reaches P', the feed end 210 is opened and the rinse gas 410 is flowed into the feed end 210 of the column 200 to maintain the pressure P' in the column 200 while continuing to remove the first product gas 510 from the product end 220 of the column 200 to sweep a remaining portion of the unadsorbed phase from the column 200 (step 54). As previously described, in an exemplary embodiment, the rinse gas 410 is a second volume of the feed gas 310. In another embodiment, wherein the method has already been performed for at least one cycle, the rinse gas 410 may be a volume of the second product gas 530. After collection of the desired volume of the first product gas 510, the feed end 210 is closed and the flow of the rinse gas 410 may be stopped and the second product gas 530 may be collected from the product end 220 of the column 200 while the pressure in the column 200 drops from P1 to P2 (step 56).

The preferred option for removing the product gases 510, 530 from the column 200 from the options described above in conjunction with FIGS. 3-5 depends on several factors including the chosen adsorbent and adsorbent characteristics, the operating pressure range, the concentration of $CF_4$ in the feed gas, the target split between the first product gas 510 and the second product gas 530, and the desired $CF_4$ concentration of the second product gas 530. The separation of the feed gas 310 into the first product gas 510 and the second product gas may be characterized according to two properties: Separation Factor, defined as the ratio of the $CF_4$ concentration of the feed gas 310 to the $CF_4$ concentration of the second product gas 530, and Product Split. For embodiments where no rinse gas is used, Product Split is defined as the ratio of the molar quantity of the second product gas 530 to the molar quantity of the feed gas 310 fed to the column 200. For embodiments where a volume of the feed gas 310 is used as the rinse gas 410, Product Split is defined as the ratio of the molar quantity of the second product gas 530 to the sum of the molar quantity of the feed gas 310 and the molar quantity of the rinse gas 410. For embodiments where a volume of the second product gas 530 is used as the rinse gas 410, Product Split is defined as the ratio of the molar quantity of the second product gas 530 minus the molar quantity of the rinse gas 410 to the molar quantity of the feed gas 310.

Because the nature of process to avoid losing essentially no $NF_3$ requires that essentially no $CF_4$ is lost as well, the maximum separation factor is constrained by the required characteristics of each of the first product gas 510 and the second product gas 530. Because lowering the $CF_4$ concentration of the second product gas 530 increases the $CF_4$ concentration of the first product gas 510, the $CF_4$ concentration of the second product gas may only be lowered to a point where the first market will still accept the $CF_4$ concentration of the first product gas 510. Having determined the Separation Factor or range of Separation Factors that will provide an acceptable first product gas 510 for the $CF_4$-tolerant first market and an acceptable second product gas 530 for the $CF_4$-sensitive first market, the Product Split or range of Product Splits that will result in the determined Separation Factor or range of Separation Factors may be calculated. For example, a $NF_3$ feed gas may contain 120 ppm $CF_4$ and the first market and the second market may have $CF_4$ tolerances of 500 ppm and 10 ppm, respectively. Accordingly, the Separation Factor must be at least 12 (120 ppm/10 ppm) to satisfy the requirements of the second market. Knowing that the first product gas may contain no more than 500 ppm, the maximum product split can be determined for process with no rinse gas as 120 ppm*(feed volume)=10 ppm*(second volume)+500 ppm*(feed volume−second volume). Solving for (second volume)/(feed volume) results in a Product Split of 77.5%. Starting from a Separation Factor of 12 and a Product Split of 77.5%, the Separation Factor may be increased to provide a product of higher purity to the second market, but the Product Split must necessarily decrease in order to maintain sufficient purity of the first product. It therefore can be seen that preferred embodiments do not necessarily maximize Separation Factor. Knowing the desired Separation Factor or range of Separation Factors and desired Product Split or range of Product Splits, a person of ordinary skill in the art based on this disclosure will understand how to adjust the appropriate variables (e.g., P1, P2, P', volumes of the first product gas 510, and volume of the second product gas 530) to achieve the desired Separation Factor and Product Split.

In some embodiments, a pump 610 may be used to increase the rate of the pressure drop within the column 200, or to decrease the pressure in the column below an equilibrium pressure (e.g., atmospheric pressure) to encourage complete desorption of the adsorbed phase. While each of the methods 30, 40, and 50 described above include removing the product gases 510, 530 from the product end 220 of the column 200 and each of the methods 30 and 50 include flowing the rinse gas 410 into the feed end 210, in some embodiments the product may be removed from the feed end 210, the rinse gas may be flowed into the product end 220, or both. Withdraw of the product gases 510, 530 from both ends of the column is also possible. However, because the $CF_4$ of the unadsorbed phase will tend to concentrate toward the product end 220, the first product gas 510 may be preferentially removed from the product end 220 to maximize the amount of $CF_4$ contained in the first product gas 510 and accordingly increase the purity of the second product gas 530.

EXAMPLES

Example 1

To demonstrate the pressure swing adsorption process of an embodiment of the present invention according to methods 20 and 30, an adsorption column having an internal diameter of 4.8 cm and a length of 78 cm was packed with 879 g of 0.16 cm diameter pellets of AW-500 adsorbent. The column initially contained $NF_3$ in equilibrium with the AW-500 at 2.7 psia and ambient temperature (25° C.).

A $NF_3$ feed gas containing 101 ppm $CF_4$ was introduced into the feed end of the column for 60 seconds at 6.9 standard liters per minute (sLpm) until the pressure in the column reached 20 psia. A $NF_3$ rinse gas containing 7 ppm $CF_4$, intended to simulate the second product gas, was flowed into the feed end of the column at 1.5 sLpm for 60 seconds while removing the first product gas from the product end of the column to maintain the pressure of 20 psia. The first product gas had a volume of 1.5 L containing 430 ppm $CF_4$. The feed end of the column was then closed while removing the second product gas until the column returned to its initial pressure of 2.7 psia which was completed in 60 seconds. The feed gas sent to the column was 6.9 L. The 1.5 L of rinse gas simulated the portion of the 6.9 L second product gas (collected from a previous cycle) used to make the first product gas. The second product gas had a volume of 6.9 L containing only 9.9 ppm $CF_4$. Because the total volume of gas removed from the column as the first product gas and the second product gas (1.5 L+6.9 L=8.4 L) is equal to the volume of gas fed into the column as either the feed gas or the rinse gas (6.9 sLpm×60 s+1.5 sLpm×60 s=8.4 L), there were no $NF_3$ losses as a result of the separation. As defined above, the Product Split was (6.9 L−1.5 L)/6.9 L=78.2%, and the Separation Factor was 101 ppm/9.9 ppm=10.2.

Example 2

The process of Example 1 was repeated except the feed gas contained 31 ppm $CF_4$ and the flow rate of the feed gas was increased to 7.0 sLpm. The various pressures within the column and the flow rate and composition were unchanged. The first product had a volume of 1.5 L containing 120 ppm $CF_4$ and the second product had a volume of 7 L containing 5.6 ppm $CF_4$. The Product Split was unchanged from Example 1, (7.0 L−1.5 L)/7.0 L=78.6%, but the decreased $CF_4$ concentration of the product gas resulted in a decreased Separation Factor of 31 ppm/5.6 ppm=5.5.

Example 3

Using the column described in Example 1, except having an initial pressure of 15 psia of $NF_3$, a $NF_3$ feed gas containing 31 ppm $CF_4$ was introduced into the feed end of the column for 60 seconds at 2.8 standard liters per minute (sLpm) until the pressure in the column reached 29.5 psia. A $NF_3$ rinse gas containing 7 ppm $CF_4$ was flowed into the feed end of the column at 0.7 sLpm for 60 seconds while removing the first product gas from the product end of the column to maintain the pressure of 29.5 psia. The feed end of the column was then closed while removing the second product gas until the column returned to its initial pressure of 15 psia.

The first product gas had a volume of 0.7 L containing 66 ppm $CF_4$ and the second product gas had a volume of 2.8 L containing only 19.5 ppm $CF_4$. The Product Split was (2.8 L−0.7 L)/2.8 L=75.0%, and the Separation Factor was 31 ppm/19.5 ppm=1.6. This example shows that the process may operate without a vacuum, which may lower operating costs, though at lower Separation Factors and Product Splits.

Example 4

The process of Example 3 was repeated except the rinse gas flow was increased to 1.0 sLpm. The other parameters were unchanged. The first product had a volume of 1.0 L containing 53 ppm $CF_4$ and the second product had a volume of 2.8 L containing 14.6 ppm $CF_4$. The Product Split was (2.8 L-1.0 L)/2.8 L=64.3%, and the Separation Factor was 31 ppm/14.6 ppm=2.1. Increasing the rinse gas flow rate improved the Separation Factor, but decreased the Product Split, indicating that reduced rinse gas rate may improve Product Split as long as the Separation Factor is sufficient to still satisfy both markets.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. In addition, features of one embodiment may be incorporated into another embodiment.

What is claimed is:

1. A method for purifying nitrogen trifluoride ($NF_3$), the method comprising:
   filling an adsorption column with a first volume of a feed gas consisting essentially of $NF_3$ and carbon tetrafluoride ($CF_4$) until the adsorption column reaches a first pressure greater than an initial pressure of the adsorption column, wherein the adsorption column includes an adsorbent material that selectively adsorbs $NF_3$ over $CF_4$,
   whereby the adsorbent material adsorbs a portion of the feed gas having a greater concentration of $NF_3$ than an unadsorbed portion;
   removing a first product gas having a greater concentration of $CF_4$ than the feed gas from the adsorption column; and,
   after removing the first product gas, removing a second product gas having a lesser concentration of $CF_4$ than the feed gas from the adsorption column, wherein the column has a second pressure less than the first pressure after removing the second product gas.

2. The method of claim 1, wherein essentially all of the $NF_3$ of the feed gas is removed as a part of the first product gas, as a part of the second product gas, or remains in the adsorption column.

3. The method of claim 1, wherein:
   removing the first product gas from the adsorption column comprises maintaining essentially the first pressure in the adsorption column by flowing a rinse gas consisting essentially of $NF_3$ and $CF_4$ into the adsorption column while removing the first product; and
   removing the second product gas comprises reducing the pressure within the adsorption column to the second pressure.

4. The method of claim 3, wherein the rinse gas comprises a second volume of the feed gas or a volume of the second product gas.

5. The method of claim 1, wherein:
   removing the first product gas from the adsorption column comprises reducing the pressure within the adsorption column to a third pressure between the first pressure and the second pressure; and
   removing the second product gas comprises reducing the pressure within the adsorption column from the third pressure to the second pressure.

6. The method of claim 5, further comprising, after the adsorption column reaches the third pressure, continuing to remove the first product gas while maintaining the third pressure in the adsorption column by flowing a rinse gas consisting essentially of $NF_3$ and $CF_4$ into the adsorption column.

7. The method of claim 6, wherein the rinse gas comprises a second volume of the feed gas or a volume of the second product gas.

8. The method of claim 1, wherein an inert carrier gas is not flowed into the adsorption column during any step of the method.

9. The method of claim 1, wherein the adsorbent material comprises an equilibrium-selective material.

10. The method of claim 9, where the equilibrium-selective material comprise a zeolite selected from the group consisting of zeolites of types LTA (Linde type A), FAU (Faujasite), CHA (Chabazite), and ERI (Erionite).

11. The method of claim 10, wherein the equilibrium-selective material comprises a mixture of primarily CHA zeolite with a smaller amount of erionite.

12. The method of claim 1, wherein the adsorbent material is a material kinetically selective for $NF_3$ having pore openings ranging from approximately 3.6 angstroms to approximately 4.6 angstroms.

13. A method for separating a mixture comprising $NF_3$ and $CF_4$, the method comprising:
   providing an adsorption column packed with an adsorbent material that preferentially adsorbs $NF_3$ over $CF_4$, wherein the adsorption column comprises a feed end and, a product end opposite the feed end, wherein the feed end and the product end are initially closed;
   opening the feed end of the adsorption column;
   flowing a first volume of a feed gas comprising $NF_3$ and $CF_4$ into the feed end of the adsorption column until the adsorption column reaches a first pressure, whereby a fraction of the $NF_3$ of the first volume of the feed gas is adsorbed by the adsorption material;
   opening the product end of the adsorption column;
   flowing a second volume of the feed gas into the feed end of the adsorption column to maintain the first pressure within the adsorption column, whereby a first product having a $CF_4$ concentration greater than the $CF_4$ concentration of the feed gas exits the product end of the adsorption column; and
   closing the feed end of the adsorption column, whereby a second product having a $CF_4$ concentration less than the $CF_4$ concentration of the feed gas exits the product end of the adsorption column until the adsorption column reaches a second pressure less than the first pressure.

14. The method of claim 13, further comprising:
   opening the feed end of the adsorption column and closing the product end of the adsorption column;
   flowing a second volume of the feed gas into the feed end of the adsorption column until the adsorption column reaches the first pressure, whereby a fraction of the $NF_3$ of the second volume of the feed gas is adsorbed by the adsorption material;
   opening the product end of the adsorption column;
   flowing a portion of the second product into the feed end of the adsorption column to maintain the first pressure within the adsorption column, whereby a third product having a $CF_4$ concentration greater than the $CF_4$ concentration of the feed gas exits the product end of the adsorption column; and
   closing the feed end of the adsorption column, whereby a fourth product having a $CF_4$ concentration less than the $CF_4$ concentration of the feed gas exits the product end of the adsorption column until the adsorption column reaches the second pressure.

15. The method of claim 14, wherein the method does not comprise using a substantial volume of an inert carrier gas.

16. The method of claim 14, wherein the adsorbent material is selected from the group consisting of zeolites of types LTA, FAU, CHA, and ERI, and materials kinetically selective for $NF_3$ having pore openings ranging from approximately 3.6 angstroms to approximately 4.6 angstroms.

17. The method of claim 16, wherein the adsorbent material comprises a mixture of primarily CHA zeolite with a smaller amount of erionite.

18. A method for separating a mixture comprising nitrogen trifluoride (NF3) and carbon tetrafluoride (CF4), the method comprising:
   providing an adsorption column packed with an adsorbent material that that preferentially adsorbs $NF_3$ over $CF_4$, wherein the adsorption column comprises a feed end and, opposite the feed end, a product end, wherein the feed end and the product end are initially closed;
   opening the feed end of the adsorption column;
   flowing a first volume of a feed gas comprising $NF_3$ and $CF_4$ into the feed end of the adsorption column until the adsorption column reaches a first pressure, whereby a fraction of the $NF_3$ of the first volume of the feed gas is adsorbed by the adsorption material;
   closing the feed end of the adsorption column;
   opening the product end, whereby a first product having a $CF_4$ concentration greater than the $CF_4$ concentration of the feed gas exits the product end of the adsorption column until the adsorption column reaches a second pressure less than the first pressure, and, after the adsorption column reaches the second pressure, a second product having a $CF_4$ concentration less than the $CF_4$ concentration of the feed gas exits the product end of the adsorption column until the adsorption column reaches a third pressure less than the second pressure.

19. The method of claim 18, further comprising flowing a second volume of the feed gas into the feed end of the adsorption column to maintain the second pressure within the adsorption column while the first product exits the product end of the adsorption column.

20. The method of claim 19, further comprising:
   opening the feed end of the adsorption column and closing the product end of the adsorption column;
   flowing a third volume of a feed gas into the feed end of the adsorption column until the adsorption column reaches the first pressure, whereby a fraction of the NF3 of the third volume of the feed gas is adsorbed by the adsorption material;
   closing the feed end and opening the product end, whereby a third product having a $CF_4$ concentration greater than the $CF_4$ concentration of the feed gas exits the product end of the adsorption column until the adsorption column reaches a second pressure less than the first pressure before closing the product end;
   opening the feed end of the adsorption column;
   flowing a portion of the second product gas into the feed end of the adsorption column to maintain the second pressure within the adsorption column while the third product exits the product end of the adsorption column; and
   closing the feed end and opening the product end, whereby a fourth product having a $CF_4$ concentration greater than the $CF_4$ concentration of the feed gas exits the product end of the adsorption column until the adsorption column reaches the third pressure.

21. The method of claim 18, wherein the method does not comprise using a substantial volume of an inert carrier gas.

22. The method of claim 18, wherein the adsorbent material is selected from the group consisting of zeolites of types LTA, FAU, CHA, and ERI, and materials kinetically selective for $NF_3$ having pore openings ranging from approximately 3.6 angstroms to approximately 4.6 angstroms.

23. The method of claim 22, wherein the adsorbent material comprises a mixture of primarily CHA zeolite with a smaller amount of erionite.

\* \* \* \* \*